United States Patent [19]

Ebato et al.

[11] Patent Number: 5,525,671
[45] Date of Patent: Jun. 11, 1996

[54] CONTINUOUS PRODUCTION PROCESS FOR LACTIDE COPOLYMER

[75] Inventors: Hiroshi Ebato; Shoji Imamura, both of Chiba, Japan

[73] Assignee: Dainippon Ink and Chemicals, Inc., Tokyo, Japan

[21] Appl. No.: 364,097

[22] Filed: Dec. 27, 1994

[30] Foreign Application Priority Data

Dec. 28, 1993 [JP] Japan .................... 5-334138

[51] Int. Cl.$^6$ .................... C08G 63/91; C08G 63/78
[52] U.S. Cl. .................... 525/53; 525/61; 525/386; 525/408; 525/437; 527/300; 528/354
[58] Field of Search ............... 525/53, 437, 386, 525/61, 408; 528/354; 527/300

[56] References Cited

U.S. PATENT DOCUMENTS

| | | | |
|---|---|---|---|
| 5,136,017 | 8/1992 | Kharas | 528/354 |
| 5,202,413 | 4/1993 | Spinu | 528/354 |
| 5,403,897 | 4/1995 | Ebato | 525/437 |

*Primary Examiner*—Patricia A. Short

*Attorney, Agent, or Firm*—Armstrong, Westerman, Hattori, McLeland & Naughton

[57] ABSTRACT

A process for continuously producing a linear lactide copolymer having a weight-average molecular weight of from 20,000 to 400,000 using a continuous reaction apparatus composed of three or more stirred flow reactors connected in series, which process comprises the steps of continuously feeding from 50 to 98 parts by weight of a lactide and from 2 to 50 parts by weight of a polymer having a hydroxyl group in a molten state or as dissolved in a solvent to the first reactor of said continuous reaction apparatus, and transferring the reaction mixture from said first reactor to the following reactors successively while maintaining the reaction pressure and the reaction temperature in every reactor in the range of from 1 to 5 atm. and of from 140° to 210° C., respectively, to conduct ring opening copolymerization. According to the process of the present invention, the production problems associated with conventional continuous production methods for lactide copolymers, i.e., high viscosity of the reaction system, thermal decomposition of the polymer produced, and coloration of the polymer produced can be eliminated, and a degradable lactide copolymer endowed with broader range properties than conventional lactide copolymers and therefore useful in wider fields can be obtained continuously and efficiently.

8 Claims, 2 Drawing Sheets

CONTINUOUS PRODUCTION PROCESS FOR LACTIDE COPOLYMER

FIELD OF THE INVENTION

This invention relates to a process for continuously producing a copolymer of a lactide and a polymer having a hydroxyl group. The lactide copolymers of the present invention are useful as packaging materials (e.g., bags, films, and binding tapes) for foods, industrial articles, fibers, and miscellaneous goods; agricultural multi-films; miscellaneous goods for daily use; containers for foods; curing sheet for concrete; pots for seedlings; and industrial materials and moldings.

BACKGROUND OF THE INVENTION

Polylactic acid obtained by ring opening polymerization of a lactide is well known as a biodegradable polymer which is susceptible to hydrolysis and also degradation by microorganisms. Conventional processes for producing polylactic acid are roughly divided into a method consisting of direct dehydrating polycondensation of lactic acid and a method consisting of dehydrating cyclization of lactic acid to obtain a lactide and ring opening polymerization of the lactide.

The former direct polycondensation method meets difficulty in obtaining a polymer having a molecular weight higher than 4,000 (see C. H. Halten, *Lactic Acid*, p. 226, Verlag Chemie (1971)). Even with manipulation added to reaction conditions for increasing the molecular weight, the highest molecular weight reached is about 20,000 as described in JP-B-2-52930 (the term "JP-B" as used herein means an "examined Japanese patent publication"). Therefore, the latter ring opening polymerization method has been used for producing higher molecular weight polymers as taught in JP-B- 56-14688.

The ring opening polymerization method has conventionally been carried out in a batch system, in which a solid lactide is charged in a stirred tank reactor, melted by heating and ring opening polymerized in the presence of a catalyst. Polylactic acid obtained by ring opening polymerization of a lactide increases its viscosity to a very high value of 10,000 poise to hundreds of thousands of poises with an increase in average molecular weight. Partly for this reason and partly because the melting point of polylactic acid is 160° C. or higher, it is preferable to keep the reaction system at a high temperature to reduce the viscosity. However, the problem is that polylactic acid or a polylactic acid copolymer easily undergoes reduction in molecular weight by heat.

Even in a closed reactor, degradation initiates at around 180° C., and molecular weight reduction is accelerated at a high temperature of 250° C. or higher. It has therefore been difficult, with a conventional stirred tank reactor, to continuously produce polylactic acid or a lactide copolymer having a high viscosity in a narrow temperature distribution range while preventing runaway of the reaction due to the heat of reaction.

Application of a method for continuously polymerizing monomers using stirred flow reactors connected in series to production of a lactide copolymer is proposed in JP-A-5-93050 (the term "JP-A" as used herein means an "unexamined published Japanese patent application"). Monomers copolymerizable with a lactide by this method include epoxy compounds, such as propylene oxide, intermolecular cyclic esters, such as glycollide, lactones, such as ε-caprolactone; and cyclic carbonate monomers, such as trimethylene carbonate.

Copolymers obtained by a lactide and the abovementioned comonomer usually have lower melting points and lower glass transition points than a lactic acid homopolymer. The transparency of the copolymers is also lower than that of polylactic acid. Further, the copolymerization shows a lower rate of reaction than the homopolymerization of a lactide, whereby reducing the productivity in spite of continuous production. The apparatus disclosed is composed of two stirred flow tanks connected in series. With this structure, however, raw materials continuously fed are incorporated into a product through a bypass in actual operation even if the retention time is extended, only to provide an opaque polymer or a polymer having insufficient physical properties.

Additionally, the reaction disclosed in JP-A-5-93050 supra is limited to homopolymerization of a lactide or copolymerization of a lactide and a copolymerizable monomer. Cases are unknown, in which a lactide and a polymer are continuously reacted in an apparatus composed of three or more stirred flow reactors connected in series.

SUMMARY OF THE INVENTION

An object of the present invention is to provide a process for effectively copolymerizing a lactide in a continuous system, the process being free from the problems associated with conventional production of lactide copolymers, such as high viscosity of the reaction system, thermal degradation of the polymer, and coloration of the polymer, thereby to provide a degradable lactide copolymer having broader range physical properties than conventional lactide copolymers and therefore useful in broad range fields, such as packaging films or sheets, injection moldings, laminates, and industrial moldings.

The inventors have conducted extensive investigations into a process for continuously producing a lactide copolymer and, as a result, found that a reaction between a lactide and a polymer having a hydroxyl group at a specific ratio in three or more reactors develops possibilities of using a variety of polymers as a reactant and producing a variety of lactide copolymers from soft to rigid with a high weight-average molecular weight ranging from 20,000 to 400,000 and excellent transparency, at a reaction rate equal to or even higher than that reached by lactide homopolymerization, achieving high productivity.

The present invention provides a process for continuously producing a linear lactide copolymer having a weight-average molecular weight of from 20,000 to 400,000 using a continuous reaction apparatus composed of three or more stirred flow reactors connected in series, which process comprises the steps of continuously feeding from 50 to 98 parts by weight of a lactide and from 2 to 50 parts by weight of a polymer having a hydroxyl group (hereinafter referred to as a hydroxyl-containing polymer) in a molten state or as dissolved in a solvent to the first reactor of the continuous reaction apparatus, and transferring the reaction mixture from the first reactor to the following reactors successively while maintaining the reaction pressure and the reaction temperature in every reactor in the range of from 1 to 5 atm. and of from 140° to 210° C., respectively, to conduct ring opening copolymerization.

In a first embodiment of the present invention, the rate of polymerization (degree of conversion) of the lactide in the first reactor is from 30 to 80% and the reaction mixture in that reactor has a viscosity of not higher than 2000 poise.

In a second embodiment of the present invention, the hydroxyl-containing polymer is a hydroxyl-terminated polyester having a melting point or a softening point of not higher than 180° C.

In a third embodiment of the present invention, from 3 to 30 parts by weight of a solvent having a boiling point of from 70° to 180° C. is used as a reaction solvent per 100 parts by weight of the total amount of the lactide and the hydroxyl-containing polymer.

In a fourth embodiment of the present invention, a residual lactide and/or a residual solvent in the copolymer obtained is/are reduced to 1% by weight or less.

In a fifth embodiment of the present invention, from 3 to 30 parts by weight of a solvent having a boiling point of from 70° to 180° C. is used as a reaction solvent per 100 parts by weight of the total amount of the lactide and the hydroxyl-containing polymer to conduct the ring opening polymerization and, after the reaction, a residual lactide and/or a residual solvent in the copolymer obtained is/are reduced to 1% by weight or less.

In a sixth embodiment of the present invention, the reaction mixture from the last stirred flow reactor is subjected to further ring opening copolymerization in a reactor equipped with a static mixer.

In a seventh embodiment of the present invention, from 3 to 30 parts by weight of a solvent having a boiling point of from 70° to 180° C. is used as a reaction solvent per 100 parts by weight of the total amount of the lactide and the hydroxyl-containing polymer to conduct the ring opening copolymerization, the reaction mixture is subjected to further ring opening copolymerization in a reactor equipped with a static mixer, and, after the reaction, a residual lactide and/or a residual solvent in the copolymer obtained is/are reduced to 1% by weight or less.

DETAILED DESCRIPTION OF THE INVENTION

The continuous reaction apparatus composed of stirred flow reactors which can be used in carrying out the process of the present invention is described below. For the sake of better understanding, the accompanying drawings are referred to.

The "stirred flow reactor" as used in the present invention is a dynamic mixing apparatus equipped with a general stirrer. More specifically, it means a reactor equipped with a stirring blade connected to a general motor, in which the blade is moved by the motor to whirl the fluid in the reactor, or to change the speed of the whirl to disturb the flow, or to convert or reverse the flow direction, and the division, conversion, and reversal are repeated thereby to mix the fluid. The stirred flow reactors are shown by symbols $R_1$ to $R_4$ in FIG. 1 and $R_1$ to $R_3$ in FIG. 2 and the motor is shown by symbol M in FIGS. 1 and 2.

The heat of stirring increases with an increase in stirring force for homogenization, which would lead to decomposition of a heat decomposable polymer. Thus, stirring is an important factor decisive on performance properties of a polymer produced.

The stirring effect, though greatly dependent on a stirring speed, is decided by a stirring time, the shape and size of a stirring blade, the size of the reactor, a clearance between a stirring blade and the wall of the reactor, and the like. It also depends on the viscosity of a polymer to be stirred. Accordingly, the stirring effect cannot be decided only by the stirring speed. Notwithstanding, the stirring in a low-viscosity liquid in the initial stage of the reaction should be effected under such conditions that the Reynolds number (Re) is 100 or more according to equation (1):

$$Re = n \times Di^2 \times \rho / \eta \qquad (1)$$

wherein Re is a Reynolds number; n is a number of rotation (rotation/sec); Di is a diameter (m) of a stirring blade; $\rho$ is a density (kg/m$^3$) of a liquid; and $\eta$ is a viscosity (kg/cm·sec) of a liquid.

In a continuous reaction by use of a plurality of reactors, while the reaction mixture in the reactor used in the initial reaction stage can be stirred satisfactorily irrespective of the shape of the stirring blade because of its low viscosity, a turbine impeller blade, a Phaudler type impeller blade, a helical ribbon blade or a combination thereof is recommended for effectively causing a flow in the vertical direction. Anchor type paddles are also preferred for their capability of uniformly agitating the whole reaction system.

The reaction mixture in the reactor used in the final reaction stage has a high viscosity so that the shape of the stirring blade largely influences the stirring effect. The stirring effect tends to become insufficient particularly in the vicinity of the reactor wall. It is therefore preferable to use a stirring blade capable of uniformly agitating the whole reaction system, such as a turbine impeller blade, a helical ribbon blade, and an anchor paddle, for effectively scraping the reaction mixture from the inner wall of the reactor.

In using an anchor paddle, since stirring is sometimes insufficient in the central portion of the reactor, it is effective to monitor the temperature of the reaction system by means of temperature sensors fitted at the inner wall of the reactor and the paddle or the axis of the paddle to confirm whether the reaction mixture at these regions is stirred satisfactorily. The temperature sensors are also useful for reaction temperature control.

The power of a stirrer largely depends on the viscosity of the reaction mixture and the shape of the reactor but may be estimated by equation (2):

$$P = k \times n^2 \times Di \times Dt^{1.1} Wi^{0.3} \times H^{0.6} \qquad (2)$$

wherein P is a stirring power (kg·m/sec); k is a coefficient dependent on a stirring blade; n is a number of rotation (rotation/sec); Di is a diameter (m) of a stirring blade; Dt is a width (m) of a reactor; Wi is a longitudinal length (m) of a stirring blade; and H is a liquid depth (m).

Some types of stirred flow reactors have a jacket for heat exchange, and some other types have in the inside thereof a heat exchanger tube in which a heat transfer medium is circulated. The temperature of the stirred flow reactor is generally controlled by circulating steam and/or a heat transfer oil on the wall and/or the bottom of the reactor.

Steam is a preferred heat transfer medium for a reaction conducted at 170° C. or lower. In case the reaction temperature abnormally increases, a cooling medium, such as water, can be circulated into the same piping used for steam. For a reaction conducted at higher than 150° C., since steam will have too increased a pressure, a heat transfer oil is preferred.

Because the reaction in the initial stage by using the reaction apparatus according to the present invention is accompanied by heat generation and also runaway of the reaction should be avoided, it is not preferable to carry out this reaction at too high a temperature. From this viewpoint, heating by steam circulation is sufficient. On the other hand, the reactors used in the later reaction stage are preferably heated by using a heat transfer oil because the reaction mixture in these reactors has a high viscosity, generates little heat, and also because a high reaction temperature is preferred for completion of the reaction. Since a heat transfer oil also works at low temperatures, all the reactors may be heated with the oil.

The greater the number of the stirred flow reactors, the more homogeneous the polymer produced. A reaction apparatus composed of two stirred flow reactors connected in series may be useful in some cases for continuous production of a polymer but is unsuitable for continuous production of a lactide copolymer of a lactide and a hydroxyl-containing polymer for the following reasons. The continuously fed starting materials and the reaction product are mixed in a stirred flow reactor and, as a result, the starting materials or the intermediate product are withdrawn from the reactor as unreacted without sufficiently increasing the molecular weight. In order to avoid this, the size of the reactor must be increased, and the retention time must be extended. However, if a large-sized reactor is used, stirring and removal of generated heat would be extremely difficult due to the highly increasing viscosity of the lactide copolymer-containing reaction system with the increasing molecular weight, thus failing to control the reaction temperature. To cope with this problem, the number of the reactors should be increased, i.e., to 3 or more.

Where starting materials of a prescribed total amount are continuously fed while withdrawing an equivalent amount of a reaction mixture as in the present invention, as the number of the reactors increases, the reaction system is effectively separated into the unreacted materials and the product to provide a product containing a lesser amount of the unreacted materials. Further, the requisite volume of each reactor would be decreased, the stirring power required for each reactor would be reduced, and the temperature control by a heat transfer medium would be easier. On the other hand, however, the number of motors and the number of pumps connecting two adjacent reactors also increase, making the reaction control complicated. Therefore, the number of the stirred flow reactors to be used should be minimized as far as a sufficient rate of polymerization is assured. The number of the reactors used in the present invention is at least 3, usually from 3 to 5.

Figure 1:
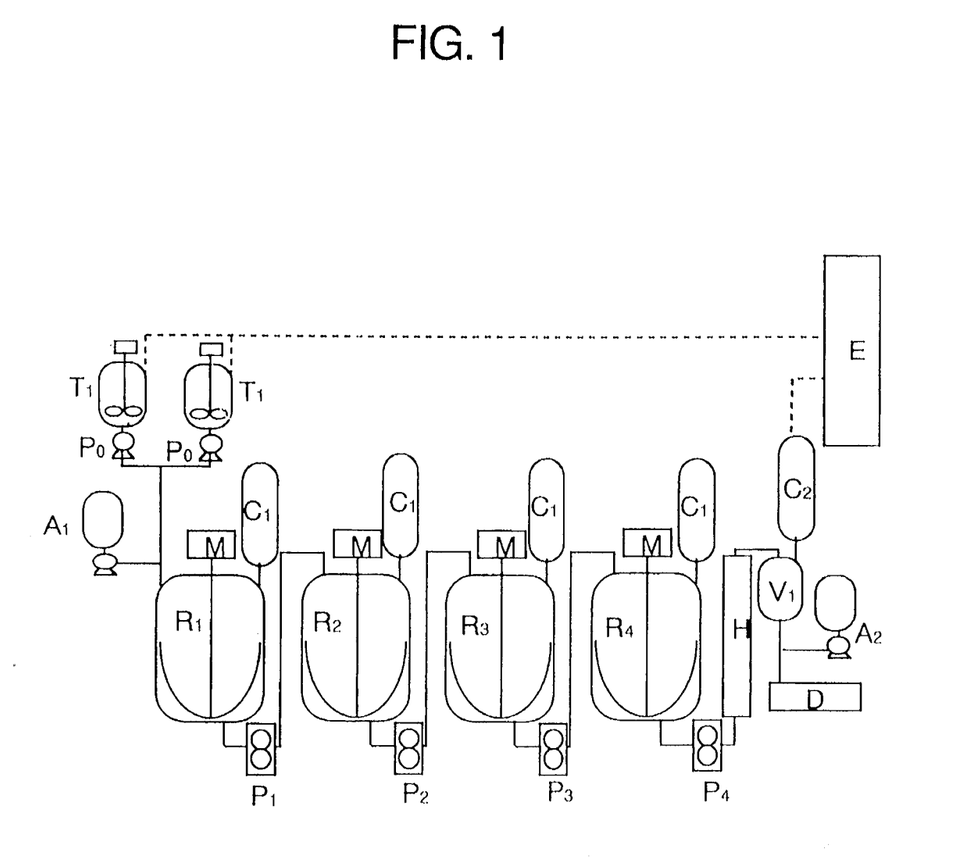
FIG. 1 shows an example of latent heat cooling type continuous reaction apparatus which can be used in the present invention.

In FIG. 1 showing a continuous reaction apparatus composed of latent heat cooling type stirred flow reactors, mentioned as an example of the reactors useful in the present invention, each reactor R has on the upper part thereof condenser $C_1$ for trapping the unreacted monomer and/or a solvent so as to control the reaction temperature utilizing the heat of evaporation of the starting monomer or a solvent. That is, reacting materials are charged in each reactor with a space left on the upper part of the reactor so that the liquid evaporates from the liquid level to dissipate the heat thereby effecting cooling.

The latent heat cooling type reactor facilitates temperature control, permits a high reaction temperature, and achieves high productivity. In order to accelerate or suppress evaporation of the monomer or the solvent, the pressure in the reactor may be either diminished or increased. To this effect, a pressure sensor is placed in the reactor, and the pressure control of the reaction system is important. The reaction system is preferably kept in an inert gas atmosphere. In order to prevent decomposition of the product due to heat or oxygen, pressure application is preferably conducted using an inert gas, such as nitrogen or argon.

Because of the vacancy in the upper part of the latent heat cooling type reactor, feeding of a reaction mixture from one reactor to another needs power for every reactor. Feeding of starting materials to the first reactor, transfer of the reaction mixture from the first reactor to the second one, and the successive transfer to the following reactor(s) are all carried out by means of a pump. Having a low viscosity, the starting materials are fed to the first reactor suitably by means of plunger pumps $P_0$. When the reaction mixture to be transferred to the second reactor still has a low viscosity, the transfer may be effected by a plunger pump. Gear pumps shown by symbols $P_1$, $P_2$, $P_3$ and $P_4$ in FIGS. 1 and 2 may be suitable in case where the reaction has considerably proceeded to have an increased viscosity in the first reactor. The kind of the pumps to be used for subsequent transfer of the reaction mixture is selected in the same manner according to the viscosity of the liquid to be transferred.

It is important that the feed rate between every two adjacent reactors be the same so that all the reactors may contain the same volume of a liquid. To this effect, it is preferable to fit each reactor with a flow meter for measuring a feed rate or a level gage for measuring the volume of the liquid and to control the whole system totally.

Figure 2:
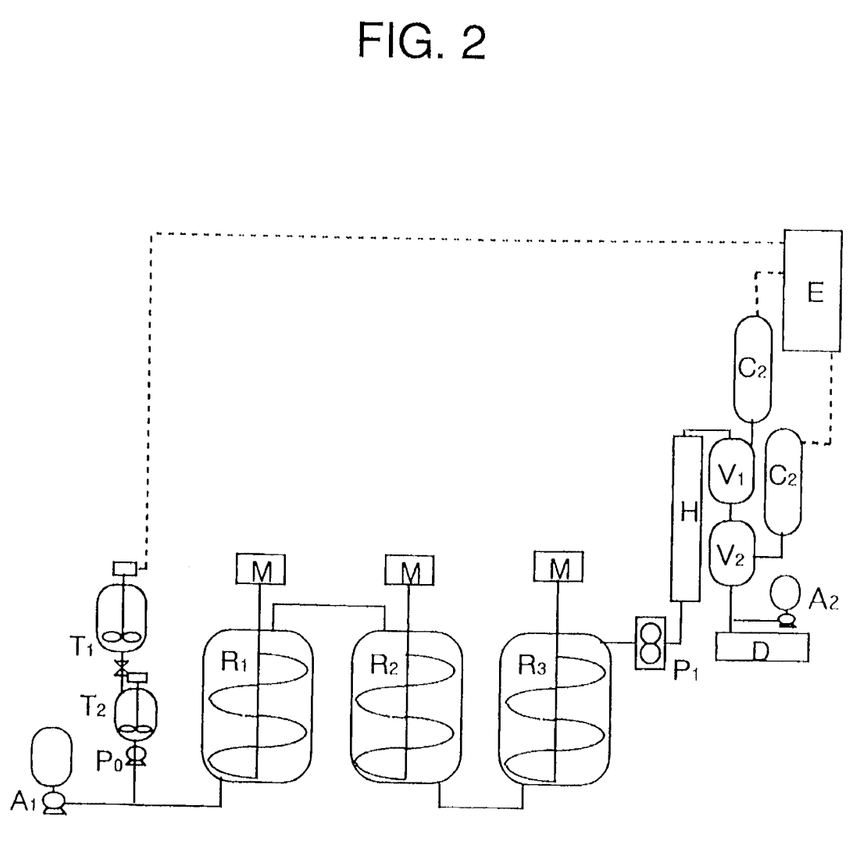
FIG. 2 shows an example of full-liquid type continuous reaction apparatus which can be used in the present invention.

The continuous reaction apparatus composed of full-liquid type stirred flow reactors shown in FIG. 2, mentioned as another example of the reactors useful in the present invention, is an apparatus in which a liquid can be forwarded through a plurality of reactors connected in series by means of a single feed pump. Only a pump for feeding starting materials to the first reactor suffices for forwarding the reaction mixture throughout the other reactors. This system offers an advantage which can never been obtained with a conventional batch reaction apparatus, that is, the reaction may be carried out in a closed system so that all the steps including charging of starting materials, reacting, volatilization and pelletization of a polymer can be performed without contact with the air. The process using the full-liquid type stirred flow reactors is particularly suitable for production of a polymer degradable with heat, oxygen or a water content as in the present invention.

Since a lactide is solid at ambient temperature and the hydroxyl-containing polymer is generally solid or semisolid, a tank for melting these starting materials or for dissolving them in a solvent is needed. Because many of the hydroxyl-containing polymers are solid and, on melting, have a high viscosity, the polymer is preferably dissolved in an appropriate solvent and mixed with a lactide solution for the sake of operation. Suitable solvents for dissolving a hydroxyl-containing polymer and/or a lactide include benzene, toluene, ethylbenzene, xylene, cyclohexanone, methyl ethyl ketone, methyl isobutyl ketone, tetrahydrofuran, and isopropyl ether.

The manner of feeding the starting materials, i.e., a lactide and a hydroxyl-containing polymer, is of great importance in the continuous production process of the present invention.

The hydroxyl-containing polymers which can be used in the present invention mostly contain a residual catalyst used for the preparation thereof. For example, a hydroxyl-containing polyester contains a catalyst for esterification. The residual catalyst also catalyzes the polymerization reaction between a lactide and the hydroxyl-containing polymer. Should the starting materials be mixed together before entering a reactor, they would start polymerization upon being melted by heating or being dissolved in a solvent under heating. As a result, the liquid to be fed tends to have an increased viscosity, causing feed trouble. Therefore, it is preferable that each of the lactide and the hydroxyl-containing polymer be dissolved in a solvent in a separate tank and be fed to the first reactor through its own feed line.

For example, FIG. 2 shows a feed system composed of tank $T_1$ where a lactide and a hydroxyl-containing polymer, and/or a solvent are mixed under heating to prepare a stock solution and tank $T_2$ where the thus prepared solution is stocked so as to always feed a starting material mixture of constant composition to a reactor. FIG. 1 shows another feed system in which each of a lactide and a hydroxyl-containing polymer is melted or dissolved in a solvent in a separate tank $T_1$, forwarded through a separate line, mixed together at an arbitrary mixing ratio before being fed to a stirred flow reactor in such a manner that a starting material mixture having a constant composition may be fed to a reactor.

In either manner of feed, temperature control in melting or dissolving the starting materials is important. The tank for melting or dissolving a lactide is preferably kept at a temperature between 95° and 145° C. for preventing a lactide from being decomposed or colored. For the same reason, the tank for melting or dissolving a hydroxyl-containing polymer is preferably kept at 95° to 165° C. Further, the atmosphere in these tanks is preferably displaced with an inert gas, such as nitrogen or argon, in order to prevent entering of oxygen or moisture.

A catalyst for polymerization is preferably added to the first reactor or to the line between the tank(s) for melting or dissolving the starting materials and the first reactor or added to every reactor in appropriately divided portions. A liquid catalyst can be added either as such or as diluted with a solvent. A solid catalyst is preferably added as dissolved in a solvent. The catalyst solution is preferably fed at a constant rate by means of plunger pump $A_1$.

For conducting the reaction rapidly and uniformly, it is important to uniformly mix a lactide, a hydroxyl-containing polymer and, if used, a solvent. Mixing of a catalyst solution and a starting material mixture is preferably effected sufficiently by using a static mixer or an in-line mixer.

After completion of the polymerization, it is preferable to remove the reaction solvent or unreacted lactide from the polymer produced from considerations for both physical properties of the polymer and environmental hygiene. The residual reaction solvent or unreacted lactide, if unremoved, tends to cause reduction in heat resistance of the polymer or unpleasant odor after molding of the polymer. In addition, the residual lactide decomposes to lactic acid which may accelerate hydrolysis of the polymer. In the present invention, it is preferable that the polymer be transferred from the last stirred flow reactor to at least one volatilizing apparatus $V_1$ and $V_2$ where any residual lactide, residual solvent or low-molecular impurities can be removed from the polymer.

The polymer from the last reactor is preferably heated before being transferred to volatilizing apparatus $V_1$ by means of preheater H equipped with a static mixer (heat exchanger) and connected to the last reactor for the purpose of giving to the polymer sufficient fluidity for discharge and also giving to the polymer heat equivalent to the latent heat of evaporation of the volatile content. Since the product withdrawn from the last reactor still contains slight amounts of unreacted starting materials or intermediate products, heating by a vertical shell-and-tube heat exchanger or a static mixer equipped with a heat exchanger is preferred also for accomplishment of the reaction of such unreacted materials or intermediate products. In particular, such a highly viscous reaction zone having a resin viscosity exceeding 10,000 poise as developed in the process of the present invention encounters with vigorous heat generation due to shearing force in stirring as well as polymerization heat. If dynamic stirring is employed in such a highly viscous zone, local heat generation would be vigorous around the agitator. From this viewpoint, use of a static mixer which imposes small shearing stress and yet exerts a stirring effect uniformly is especially preferred.

The volatilizing apparatus is usually composed of a single vertical volatilizing tank $V_1$ in which volatilization is carried out at a temperature at which a residual lactide or a residual solvent is volatilized. If desired, two volatilizing tanks $V_1$ and $V_2$ may be used. In this case, volatilization is conducted at a degree of vacuum of 20 to 150 mmHg in the first tank and at a higher degree of vacuum, e.g., 1 to 20 mmHg in the second tank.

The vacuum volatilizing apparatus which can be used in the present invention are conventional and include a flash type volatilizing apparatus in which a molten polymer is extruded into a tank in a single strand or a number of strands, a vented extruder type volatilizing apparatus, and a thin film type volatilizing apparatus for high viscosity liquids.

In using a flash type volatilizing apparatus, it is preferable to heat the molten polymer with a heat exchanger, etc. before being introduced into a volatilizing apparatus to prevent hardening of the polymer by the evaporation latent heat of the volatile content. It is also preferable to feed the polymer to the volatilizing apparatus at a constant rate by using a gear pump, etc. After volatilization, the polymer is withdrawn from the bottom of the flash tank by means of a gear pump or a screw pump and then forwarded to a pelletizer.

In using a vented extruder type volatilizing apparatus, a twin screw extruder is preferred to a single screw extruder because of its high thrust. In this type of volatilizing apparatus, the shape of the screw is an important factor for the degree of vacuum at the vent, the time of volatilization, and the efficiency of volatilization. Volatilization time control is easy with this type of apparatus. Since a shear stress is apt to be posed on the molten polymer, volatilization is preferably conducted in a short time. If desired, a plurality of vents may be provided to adjust the degree of vacuum.

A high viscosity type thin-film volatilizing apparatus is also useful. In this type of apparatus, the shape of the screw is an important factor for the time and efficiency of volatilization. While a shear stress is apt to be imposed on the molten polymer, volatilization can be completed in a short time by the efficiently broadened surface area.

After volatilization, the polymer may be withdrawn from the volatilizing apparatus and pelletized by pelletizer D, or the polymer may be extruded from a vented extruder into strands having a diameter of 0.3 to 3 mm and cut to pellets.

The polymer after volatilization can be withdrawn by means of a gear pump, while the unreacted lactide can be condensed in condenser $C_2$, forwarded to reprocessing step E, and reused as a starting lactide. In FIGS. 1 and 2, the broken line means a circulating line of the recovered material.

Reprocessing of the unreacted lactide can be conducted by distillation and/or recrystallization. The solvent can be reprocessed by distillation. By the use of the above-mentioned volatilizing apparatus, the residual monomer content in the lactide copolymer obtained can be reduced to 1% by weight or less, preferably 0.2% by weight or less.

For further plasticization, improvement in thermal stability during molding, oxidation inhibition or improvement in flame retardancy, modifying additives may be added to the resulting lactide copolymer. Addition line $A_2$ for the additives can be provided immediately after the last stirred flow reactor and/or immediately after the volatilizing apparatus. After compounding of additives, the compound may be pelletized as such or, if desired, after further mixed in an extruder, a static mixer, etc.

In the process according to the present invention, since a lactide solidifies at room temperature and the produced lactide copolymer generally initiates slow decomposition at around 180° C., temperature control during transfer of the starting material and the product is of particular importance. Considering that a lactide has a melting point of about 100° C., the hydroxyl-containing polymer is generally solid or semi-solid, and the produced copolymer is also solid, the transfer lines for them are preferably kept at a temperature of 100° C. or higher, and still preferably at a temperature of from 125° to 165° C. at which the transferred material exhibits sufficient fluidity while undergoing no abrupt reaction. Since existence of a catalyst in a starting material mixture of a lactide, a hydroxyl-containing polymer and a solvent tends to cause polymerization, resulting in a steep increase in viscosity, a catalyst for polymerization is preferably added to the first reactor or to the transfer line between the tank for preparing a starting material solution or mixture and the first reactor or added to every reactor in appropriately divided portions.

The transfer lines for the produced polymer and its solvent solution are preferably kept at an elevated temperature because of their high viscosity. The lowest temperature at which the produced polymer starts thermal decomposition is about 185° C., while varying depending on the components used. Therefore, it is essentially unfavorable to increase the temperature above this point. However, if these lines are at too low a temperature, the produced polymer would solidify or, even in the presence of a solvent, be separated from the solvent. Therefore, the lines must be kept at temperatures at which the produced polymer can be transferred with fluidity, usually 150° C. at the lowest. The temperature range in which sufficient fluidity can be assured while minimizing decomposition of the produced polymer is usually from 160° to 210° C., preferably from 160° to 180° C.

The components of the lactide copolymer according to the present invention are described below. A lactide is a cyclic diester obtained by intermolecular dehydrating cyclization of two molecules of lactic acid and includes steric isomers attributed to the steric isomers of lactic acid, i.e., L-lactide obtained from two molecules of L-lactic acid, D-lactide obtained from two molecules of D-lactic acid, and DL-lactide obtained from one molecule of L-lactic acid and one molecule of D-lactide acid. These isomers and a mixture thereof show slightly different physical properties from each other. Therefore, a lactide copolymer with desired properties can be obtained by properly selecting the kind of the isomer or a mixing ratio of the isomers. For example, in order to produce a lactide copolymer having excellent thermal properties, it is preferable to use a lactide comprising at least 75% by weight, still preferably at least 90% by weight, of L-lactide.

The hydroxyl-containing polymer which can be used in the present invention includes a variety of kinds. Thus, lactide copolymers obtained therefrom have broad range properties from soft to rigid. While not limiting, the hydroxyl-containing polymers preferably include polyesters or polyoxyalkylene ethers having a hydroxyl group at the terminal thereof. Lactide copolymers obtained by using these polymers tend to have almost a block or random structure.

Additionally, polyvinyl alcohol, starch, cellulose, and cellulose ethers are also useful as a hydroxyl-containing polymer. Lactide copolymers obtained by using these polymers tend to have a structure close to a grafted copolymer structure. Polymers having an ester linkage, such as polyvinyl acetate, a vinyl acetate-ethylene copolymer, polycarbonates, and cellulose esters, are useful as well.

Copolymerization of a lactide with these hydroxyl-containing polymers results in production of a lactide copolymer having not only various properties but a high molecular weight. Besides, the rate of reaction of this copolymerization is equal to that obtained in homopolymerization of a lactide. This is because the hydroxyl group possessed by the starting polymer acts for control of chain transfer in chain propagation. Successive propagation of a polymer chain is considered to be a reaction in which a catalyst metal coordinates to a carboxyl anion, and a lactide monomer is inserted (see *Macro Chem.*, Vol. 187, pp. 1611–1625 (1986) and *Eur. Polym. J.*, Vol. 25, pp. 585–591 (1989)). The propagating terminal of the polymer activated by a catalyst undergoes chain transfer by the action of a hydroxyl group. Unlike a strongly acidic functional group such as a carboxyl group, a hydroxyl group is advantageous in that it does not deactivate the catalyst.

Therefore, a hydroxyl-containing polymer serves for both molecular weight control and reaction acceleration. This is the reason why the reaction between a lactide and a hydroxyl-containing polymer provides a copolymer exhibiting various properties over broad range, from soft to rigid. For example, lactide copolymers obtained by using polyvinyl alcohol, polyvinyl acetate, a vinyl acetate-ethylene copolymer, a cellulose ether or a soft polyester possess softness, and those obtained by using a polycarbonate, a cellulose ester, or a rigid polyester have high strength.

Hydroxyl-containing polymers may be used either individually or as a combination of two or more thereof without any limitation. In particular, polymers having a relatively high molecular weight, e.g., a weight-average molecular weight of 10,000 to 300,000, still preferably 20,000 to 200,000, and having a melting point or a softening point of not higher than 180° C. are preferred.

The reaction mechanism of the copolymerization between a lactide and a hydroxyl- and/or ester bond-containing polymer is complicated. Taking the reaction with a hydroxyl-containing polyester as an instance, gel-permeation chromatography reveals that ring opening polymerization of a lactide preferentially proceeds in the initial stage and, after formation of a lactic acid oligomer to some extent, graft copolymerization and interesterification proceed between the lactic acid oligomer and the hydroxyl-containing polyester to produce a copolymer. Such a lactide copolymer produced through ring opening polymerization and interesterification has substantially a linear structure.

The hydroxyl-containing polyester to be used in the present invention preferably has either one of a melting point or a softening point, which one is lower than the other, of not higher than 180° C., and particularly of from 50° to 150° C. Such a polymer is easily dissolved in a lactide during polymerization so that the reaction proceeds with the starting materials being mixed together well thereby to obtain a homogeneous lactide copolymer. The copolymerization temperature is not lower than 140° C. In order that a hydroxyl-containing polymer can easily be dissolved in a lactide at that temperature, either lower one of a melting point and a softening point of the polymer is preferably not higher than 180° C. Whether the polymer is crystalline or non-crystalline is not so important, but non-crystalline transparent polyesters are preferred. The "melting point" as referred to herein is a value as measured by differential scanning calorimetry (DSC), and the "softening point" as referred to herein is in accordance with JIS K-2531.

The hydroxyl-containing polyester preferably has a high molecular weight, e.g., a weight-average molecular weight of 10,000 to 300,000. To this effect, a molar ratio of a dicarboxylic acid component and a diol component is preferably approximately 1.

Dicarboxylic acid components and diol components constituting hydroxyl-containing polyesters are not particularly limited. In using aliphatic dicarboxylic acid components, those having 4 to 20 carbon atoms, such as succinic acid, adipic acid, azelaic acid, sebacic acid, brassylic acid, and cyclohexanedicarboxylic acid, are preferred. Dimer acids are also preferred. Suitable aromatic dicarboxylic acid components include phthalic acid, isophthalic acid and/or terephthalic acid and, in addition, 2,6-naphthalenedicarboxylic acid.

Suitable diol components include ethylene glycol, propylene glycol, butylene glycol, pentanediol, hexamethylene glycol, octanediol, neopentyl glycol, cyclohexanedimethanol, hydrogenated bisphenol A, xylene glycol, diethylene glycol, triethylene glycol, dipropylene glycol, dibutanediol, and 3-hydroxypivalyl pivalate.

It is preferable to use aliphatic dicarboxylic acid components in a proportion of from 10 to 50% by molar ratio based on the total dicarboxylic acid components.

A hydroxyl-containing polymer is preferably dried to remove the water content beforehand. Drying can be effected by a vacuum drying method, a method of maintaining the polymer in a dry atmosphere, or a method comprising dissolving the polymer in a solvent and bubbling a dried gas through the solution. The water content of a hydroxyl-containing polymer is preferably as low as possible, desirably not higher than 1,000 ppm, more desirably not more than 100 ppm.

Lactide copolymers having a high melting point or a high glass transition point can be obtained depending on the properties of the polylactic acid moiety having a high ester linkage content. For example, some lactide copolymers obtained by the process of the present invention can have a glass transition point higher than room temperature or a melting point not lower than 160° C. Such lactide copolymers can be obtained by using a lactide and a hydroxyl-containing polyester at a weight ratio of 50/50 to 98/2. For obtaining copolymers having higher transparency and a glass transition point of 45° C. or higher, a weight ratio of a lactide to a hydroxyl-containing polyester is preferably 85/15 to 95/5.

In carrying out the process of the present invention, it is desirable to use a catalyst for ring opening polymerization. Useful catalysts for ring opening polymerization include metals generally known as a catalyst for ring opening polymerization of cyclic esters or a catalyst for interesterification, such as tin, zinc, lead, titanium, bismuth, zirconium and germanium, and derivatives thereof. The metal derivatives preferably include organometallic compounds, and metal carbonates, oxides or halides. Examples of suitable catalysts are tin octanoate, tin chloride, zinc chloride, zinc acetate, lead oxide, lead carbonate, titanium chloride, titanium alkoxides, germanium oxide, and zirconium oxide.

The catalyst for ring opening polymerization is preferably used in an amount of from 10 to 2,000 ppm based on the total weight of the lactide and the hydroxyl-containing polymer. For assuring a sufficient reaction rate and for reducing coloration of the product, 20 to 1,000 ppm is still preferred.

In preparing a lactide copolymer from a lactide and a hydroxyl-containing polymer in the presence of a catalyst, the reaction system may further contain a cyclic ester other than a lactide, such as glycollide and lactones, especially ε-caprolactone and δ-valerolactone. According as the amount of glycollide or lactones increases, the glass transition point of the polymer produced decreases and becomes softer.

The amount of glycollide or lactones to be added is preferably not more than 30% by weight based on the total amount of a lactide and a hydroxyl-containing polymer. If the amount of glycollide or lactones added is more than 30% by weight, the resulting polymer has reduced transparency. In the present invention, a molecular weight modifier, such as water, lactic acid, glycolic acid, and other alcohols and carboxylic acids, can be used in an amount of up to 0.1% by weight.

The lactide copolymers obtained by the process of the present invention have a weight-average molecular weight of from 20,000 to 400,000. The lactide copolymers having a molecular weight within this range provide, when sheeted, high strength to soft sheeting, for example, sheeting having a tensile viscoelasticity ranging from 500 to 50,000 kg/cm$^2$ (as measured at 23° C. and 50% RH with a dynamic viscoelasticity meter DMS200, manufactured by Seiko Instruments Inc.) with the thickness ranging from 100 to 500 μm.

The lactide copolymers obtained by the present invention exhibit satisfactory biodegradability and serve for reduction of waste both after use as general-purpose resins or packing materials and from the factories. Even if dumped into the sea, they undergo hydrolysis or degradation with microorganisms and lose strength and shape as a resin within several months.

The process for continuously producing a lactide copolymer according to the present invention will be described below in detail.

The total retention time from the first to the last reactors cannot be specified because it varies depending on the kind of the hydroxyl-containing polymer used and the mixing ratio of the hydroxyl-containing polymer to a lactide. It is usually from 2 to 8 hours, preferably 3 to 6 hours, in the case of using full-liquid type reactors and from 1 to 5 hours, preferably from 1.5 to 3 hours, in the case of using latent heat type reactors.

The rate of polymerization, which is proportional to the retention time, cannot be specified for the same reason. The rate of polymerization in the initial stage (called the first section), especially in the first reactor, is usually in the range of from 30 to 80%, preferably from 40 to 70%.

The reaction temperature for obtaining the above rate of polymerization cannot also be specified because it varies depending on the kind of the hydroxyl-containing polymer, the mixing ratio of the polymer to a lactide, and the reaction time. Since in the initial stage the reaction system contains a high proportion of a reactive monomer (lactide), the reaction proceeds smoothly, and a large quantity of heat is generated, the reaction in the first section, especially in the first reactor, is preferably performed at a rather low temperature, e.g., 120° to 165° C., for a period of from 0.5 to 2 hours.

It is necessary to control the viscosity of the reaction system in the first reactor so as to assure satisfactory mixing of the starting materials. Sufficient mixing of a lactide monomer and a copolymerizable hydroxyl-containing polymer is important for obtaining a homogeneous copolymer. It also means satisfactory mixing with a catalyst, leading to improvements in reaction rate and homogeneity. Specifically, the viscosity of the reaction mixture in the first reactor is desirably maintained at 2000 poise or lower, preferably from 0.1 to 1000 poise, still preferably from 1 to 500 poise. It is required to appropriately select the reaction temperature, the feed rates of the starting materials, and the amounts of the solvent and the catalyst before the above-described conditions in the first reactor, i.e., the rate of polymerization, the reaction time and the viscosity, can be fulfilled. An example of preferred combinations of reaction conditions in the first section, particularly in the first reactor, is 145° to 160° C. in temperature; 0.5 to 1 hour in time; 150 to 250 ppm in amount of the catalyst; 10 to 20% in amount of the solvent; 40 to 70% in rate of polymerization; and 10 to 500 poise in viscosity.

In the subsequent middle reaction stage, i.e., the so-called second section from the second reactor to the second last reactor, the rate of polymerization of the lactide is preferably maintained at 55 to 95%, particularly 60 to 90%. The reaction becomes slightly milder in this section so that the reaction temperature is preferably set at 150° to 180° C. so as to increase the reaction rate.

The viscosity of the reaction mixture in the second section varies depending on the properties of the lactide copolymer under production and whether a solvent is used or not. In the case of producing a rigid lactide copolymer, the viscosity is preferably kept at the range of from 100 to 3000 poise, still preferably from 200 to 2000 poise.

In particular, the viscosity in the second last reactor is preferably kept at 4000 poise or lower, still preferably between 500 and 3000 poise. In the case of producing a soft lactide copolymer, while the reaction mixture shows no extreme increase in viscosity during the reaction, the viscosity is preferably kept between 20 and 1500 poise. In the case of producing a lactide copolymer in the middle between rigid and soft, the viscosity is controlled therebetween.

An example of preferred combinations of reaction conditions in the second section is 160° to 170° C. in temperature; 0.5 to 3 hours in time; 80 to 95% in rate of polymerization; and 100 to 3000 poise in viscosity.

In the final reaction stage (called the third section), particularly in the last reactor, the polymerization rate of the lactide is set within a range of from 80 to 99%, preferably from 85 to 98%. Containing only a small amount of a reactive lactide monomer, the reaction mixture shows a low reaction rate and generates little heat but has a high viscosity due to the high proportion of the polymer produced. Accordingly, for completion of the reaction and for reduction in viscosity, the reaction temperature in this stage is preferably kept rather high, i.e., between 160° and 200° C.

The viscosity of the reaction mixture in the final stage varies depending on the properties of the resulting lactide copolymer. In the case of a rigid lactide copolymer, the viscosity in the last reactor is 1000 poise or higher, usually around 4000 poise. In the case of a soft lactide copolymer, the viscosity does not extremely increase even in the last reactor. Where a solvent is used, in particular, the viscosity is as low as about 100 poise, mostly about 500 poise. In the case of a lactide copolymer in the middle between soft and rigid, the viscosity is also in the middle.

An example of preferred combinations of reaction conditions in the third section, particularly in the last reactor, is 160° to 170° C. in temperature; 0.5 to 2 hours in time; 90 to 98% in rate of polymerization; and from 3000 to 5000 poise in viscosity of a rigid copolymer or from 300 to 1000 poise in viscosity of a soft copolymer.

If desired, a polyfunctional isocyanate compound and/or a polyfunctional acid anhydride, such as pyromellitic anhydride, may be added in the production of a lactide copolymer. In this case, the polymer chain is crosslinked to provide a lactide copolymer having a further increased molecular weight.

Suitable polyfunctional isocyanate compounds include hexamethylene diisocyanate, toluene diisocyanate, diphenylmethane diisocyanate, a reaction product between a polyol, such as pentaerythritol, and a diisocyanate, a reaction product between a polyether and a diisocyanate, and a reaction product between a polyester and a diisocyanate.

The total amount of these polyfunctional compounds to be added is preferably decided according to the molecular weight of a lactide copolymer and the molecular weight of the diisocyanate used. In general, they are used in a total amount of from 0.5 to 1.5 equivalents per equivalent of a lactide copolymer. For example, hexamethylene diisocyanate is added to a lactide copolymer having a molecular weight of 170,000 in an amount of from 50 to 150 ppm.

If desired, the lactide copolymer of the present invention may contain various additives well known in the art. The additives can be added before, during or after the reaction.

Typical examples of useful additives include antioxidants, such as 2,6-di-t-butyl-4-methylphenol (BHT), pentaerythritol-tetrakis(3-(3,5-di-t-butyl-4-hydroxyphenyl)propionate), octadecyl-3-(3,5-di-t-butyl-4-hydroxyphenyl)propionate, triphenyl phosphite, trinonylphenyl phosphite, and butyl hydroxyanisole (BHA); ultraviolet absorbents, such as salicylic acid derivatives, benzophenone compounds, and benzotriazole derivatives; and heat stabilizers, such as phosphoric esters, isocyanate compounds, and carbodiimide. While not limiting, these stabilizers are preferably added in an amount of from 100 to 10000 ppm, preferably from 500 to 5000 ppm, based on the weight of the lactide copolymer.

The lactide copolymer obtained in the present invention exhibits sufficient plasticity for molding by itself. If particularly high plasticity is demanded, a plasticizer, such as dioctyl adipate, dioctyl sebacate, trioctyl trimellitate, diethyl phthalate, dioctyl phthalate, polypropylene adipate, and butanediol adipate, may be added. Adipic polyester plasticizers are preferred for their compatibility with lactide copolymers and plasticizing efficiency. In particular, adipic polyesters having a molecular weight of not more than 20,000 and with their terminals blocked with an alcohol, etc. are preferred for their satisfactory stability during molding and processing. While not limiting, these plasticizers are preferably added in an amount of from 1 to 30% by weight based on the weight of the lactide copolymer. Addition of more than 30% tends to cause bleeding.

In addition, metallic soaps, such as zinc stearate, magnesium stearate, and calcium stearate; lubricants, such as mineral oils, liquid paraffin, and ethylenebisstearamide; nonionic surface active agents, such as glycerin fatty acid esters and sucrose fatty acid esters; ionic surface active agents, such as alkylsulfonates; and colorants, such as titanium oxide and carbon black, may be used as far as the advantages of the present invention are not impaired.

According to the continuous production method of the present invention, the hydroxyl-containing polymers copolymerizable with a lactide are not so limited as monomers copolymerizable with a lactide have been. That is, a lactide monomer can be copolymerized with a vinyl polymer or a condensed type polyester. Conventionally reactive monomers that are copolymerizable with a lactide are limited to epoxy compounds, cyclic esters, lactones, and cyclic carbonates, which only provide lactide copolymers having high softness. According to the present invention, on the contrary, a lactide can be copolymerized with a wide variety of hydroxyl-containing polymers, for example, those having high heat resistance, such as polyethylene terephthalate and bisphenol A type polycarbonate. A lactide can also be copolymerized with a crystalline polyester, such as polyethylene succinate, in a manner like block copolymerization and/or random copolymerization.

The present invention will now be illustrated in greater detail with reference to Examples and Comparative Examples, but it should be understood that the present invention is not construed as being limited thereto. Unless otherwise indicated, all the percents are by weight.

EXAMPLE 1

Four 7 l-volume latent heat cooling type stirred flow reactors each equipped with a condenser on the upper part thereof and an anchor paddle were connected in series to constitute a continuous reaction apparatus. To the last reactor was connected a volatilizing tank via a ½ in. Kenics type static mixer, manufactured by Noritake Co., Ltd.

Starting materials were prepared in separate feed stock tanks in a nitrogen atmosphere. In one of the tanks, a lactide was melted at 110° C., and in another one a hydroxyl-containing polymer was dissolved in toluene at 140° C. to prepare a 25% toluene solution. The two liquids were fed to the first reactor by a plunger pump at a respective feed rate predetermined so as to give an average retention time of 6 hours. Tin octanoate as a catalyst was continuously added to the transfer line connecting the two feed stock tanks to the first reactor. The feed rate of each component and the composition of the starting material mixture were as follows.

Feed Rate:
  Lactide: 4.63 l/hr
  Toluene solution of polymer: 0.97 l/hr
  Catalyst: 2.2 ml/hr
Composition of Starting Material Mixture:
  L-Lactide: 78%
  D-Lactide: 4%
  Polymer: 5%
  Toluene: 13%

As the hydroxyl-containing polymer, a polyester consisting of 14 mol % of terephthalic acid, 16 mol % of isophthalic acid, 20 mol % of adipic acid, 28 mol % of ethylene glycol, and 22 mol % of neopentyl glycol and having a number-average molecular weight of 45,000 (on polystyrene conversion) was used.

The above-described feed rate of the catalyst, tin octanoate, corresponded to 500 ppm based on the starting material mixture. The liquid level of the reaction mixture in each reactor was monitored through a window provided on the wall of the reactor, and the reaction mixture was continuously transferred from the bottom of the reactor to the next one by means of a gear pump.

The controlled temperature and the viscosity of the reaction mixture in each reactor were as follows.
  The first reactor: 145° C., 20 poise
  The second reactor: 165° C., 700 poise
  The third reactor: 175° C., 2600 poise
  The fourth reactor: 175° C., 3200 poise All the reactors had an inner pressure of from 1.3 to 1.5 atms during the reaction. After completion of the polymerization, the reaction mixture was treated in the static mixer having a heat exchanger set at 220° C. and then in the volatilizing tank under the degree of vacuum of 6 Torr.

The volatile content from the volatilizing tank was collected in a condenser and subjected to distillation to recover the lactide in an amount of about 6% based on the feed, revealing that the reaction rate of the lactide was 94%.

The resulting polymer was pelletized, and various properties were measured. The resulting pellets were slightly yellow-tinted and transparent. As a result of gel-permeation chromatograph (hereinafter abbreviated as GPC), the molecular weight was 140,900; the residual content of the lactide monomer was 0.4%; and no toluene was detected. The melting point as measured by differential scanning calorimetry (hereinafter abbreviated as DSC) was 174.1° C.

EXAMPLE 2

Three 4 l-volume full-liquid type stirred flow reactors each equipped with a helical type stirring blade were connected in series to constitute a continuous reaction apparatus. To the last reactor were connected two volatilizing tanks via a ½ in. Kenics type static mixer, manufactured by Noritake Co., Ltd.

A lactide and a hydroxyl-containing polymer were dissolved in toluene at 110° C. in a nitrogen atmosphere to prepare a 15% toluene solution and fed to the first reactor by a plunger pump at a prescribed feed rate so as to give an average retention time of 8 hours. Tin octanoate as a catalyst was continuously added to the transfer line to the first reactor in the same manner as in Example 1. The feed rate of each component and the composition of the starting material mixture were as follows.

Feed Rate:
  Starting material mixture: 1.5 l/hr
  Catalyst: 0.5 ml/hr
Composition of Starting Material Mixture:
  L-Lactide: 73%
  D-Lactide: 4%
  Polymer: 10%
  Toluene: 13%

As the hydroxyl-containing polymer, a polyester consisting of 50 mol % of succinic acid and 50 mol % of ethylene glycol and having a number-average molecular weight of 77,000 (on polystyrene conversion) was used, The above-described feed rate of the catalyst, tin octanoate, corresponded to 400 ppm based on the starting material mixture. The polymer produced was continuously withdrawn from the discharge opening at the top of the last reactor by means of a gear pump.

The controlled temperature and the viscosity of the reaction mixture in each reactor were as follows.
  The first reactor: 155° C., 100 poise
  The second reactor: 165° C., 2100 poise
  The third reactor: 165° C., 3900 poise The reaction mixture withdrawn was forwarded to a first volatilizing tank through a first heat exchanger and then forwarded to a second volatilizing tank through a second heat exchanger. The first volatilizing tank was kept at a degree of vacuum of 110 Torr and the temperature of the first heat exchanger was set at 220° C. The second volatilizing tank was kept at a degree of vacuum of 8 Torr and the temperature of the second heat exchanger was set at 220° C. The volatile matter recovered from the first volatilizing tank substantially comprised toluene, which could be reused after drying. The volatile matter recovered from the second volatilizing tank mainly comprised the lactide with a minor proportion of lactic acid and a lactic acid dimer, which was then subjected to distillation to recover the lactide.

The resulting polymer was pelletized, and various properties were measured. The pellets were slightly yellow-tinted and transparent. As a result of GPC, the molecular weight was found to be 128,800; the residual content of the lactide monomer was 0.5%; and no toluene was detected. The melting point as measured by DSC was 158.2° C.

COMPARATIVE EXAMPLE 1

L-Lactide and ε-caprolactone were copolymerized using the same apparatus as used in Example 2, except that two out of the three stirred flow reactors were used and the second reactor was connected to two volatilizing tanks via a ½ inc. static mixer. The starting material mixture was prepared by melting L-lactide and ε-caprolactone at a weight ratio of 95%:5% at 110° C. in a nitrogen atmosphere and fed to the first reactor by means of a plunger pump so as to give an average retention time of 8 hours. Tin octanoate as a catalyst was added in the same manner as in Example 2. The feed rates of the starting material mixture and the catalyst were 1.0 l/hr and 0.3 ml/hr, respectively. The feed rate of the catalyst corresponded to 400 ppm. The produced polymer was continuously withdrawn from the discharge opening at the top of the second reactor by means of a gear pump.

The controlled temperature and the viscosity of the reaction mixture in each reactor were as follows.

The first reactor: 165° C., 6800 poise

The second reactor: 165° C., 24000 poise

The reaction mixture withdrawn was forwarded to a first volatilizing tank through a first heat exchanger and then forwarded to a second volatilizing tank through a second heat exchanger. The first volatilizing tank was kept at a degree of vacuum of 110 Torr and the temperature of the first heat exchanger was set at 220° C. The second volatilizing tank was kept at a degree of vacuum of 8 Torr and the temperature of the second heat exchanger was set at 220° C. The volatile matter recovered from the volatilizing tanks was collected by a separate condenser. Almost no volatile matter was recovered from the first volatilizing tank. The volatile matter recovered from the second volatilizing tank mainly comprised the lactide with lactic acid and a lactic acid dimer. About 27% of the lactide fed was recovered, revealing that the reaction rate of the lactide was 73%.

The resulting polymer was pelletized, and various properties were measured. The pellets were slightly yellow-tinted and transparent. As a result of GPC, the molecular weight was found to be 182,300, and the residual content of the lactide monomer was 1.7%. The melting point as measured by DSC was 156.7° C.

COMPARATIVE EXAMPLE 2

A lactide and a hydroxyl-containing polymer were copolymerized using the same apparatus as used in Example 1, except that two out of the four stirred flow reactors were used and the second reactor was connected to two volatilizing tanks via a ½ inc. static mixer. A lactide and a hydroxyl-containing polymer were dissolved in toluene at 110° C. in a nitrogen atmosphere to obtain a 15% toluene solution, which was fed to the first reactor by means of a plunger pump so as to give an average retention time of 6 hours. Before entering the first reactor, the starting material solution underwent polymerization by the action of the catalyst previously present in the hydroxyl-containing polymer and increased its viscosity, resulting in trouble in feeding. Tin octanoate as a catalyst was added to the transfer line to the first reactor in the same manner as in Example 1.

The feed rates of the starting materials mixture and the catalyst were 2.3 l/hr and 1.1 ml/hr, respectively. The composition of the starting material solution was as follows.

L-Lactide: 73%

D-Lactide: 4%

Polymer: 10%

Toluene: 13%

As the hydroxyl-containing polymer, a polyester consisting of 50 mol % of succinic acid and 50 mol % of ethylene glycol and having a number-average molecular weight of 77,000 (on polystyrene conversion) was used. The above-described feed rate of the catalyst, tin octanoate, corresponded to 500 ppm. The polymer produced was continuously withdrawn from the discharge opening at the top of the last reactor by means of a gear pump.

The controlled temperature and the viscosity of the reaction mixture in each reactor were as follows.

The first reactor: 165° C., 2200 poise

The second reactor: 165° C., 2700 poise

The reaction mixture withdrawn was heated in the static mixer having a heat exchanger set at 220° C. and then forwarded to the two volatilizing tanks. The first volatilizing tank was kept at a degree of vacuum of 110 Torr. The second volatilizing tank was kept at a degree of vacuum of 8 Torr. As a result, about 19% of the lactide fed was recovered, revealing that the reaction rate of the lactide was 81%.

The resulting polymer was pelletized, and various properties were measured. The pellets were yellow-tinted, brittle, and semi-transparent. As a result of GPC, the molecular weight was found to be 101,200; the residual content of the lactide monomer was 2.2%; no toluene was detected; and a fraction having a molecular weight of about 82,000, which seemed to be a hydroxyl-containing polymer, was observed. The melting point as measured by DSC was 156.2° C.

As described and demonstrated above, the present invention eliminates the production problems associated with conventional continuous production methods for lactide copolymers, i.e., high viscosity of the reaction system, thermal decomposition of the polymer produced, coloration of the polymer produced, and the like. The present invention thus provides a process for continuously and effectively producing a degradable lactide copolymer which can be endowed with broader range properties than conventional lactide copolymers and are therefore useful in wider fields as packaging films or sheets, injection moldings, laminates, and industrial moldings.

While the invention has been described in detail and with reference to specific examples thereof, it will be apparent to one skilled in the art that various changes and modifications can be made therein without departing from the spirit and scope thereof.

What is claimed is:

1. A process for continuously producing a linear lactide copolymer having a weight-average molecular weight of from 20,000 to 400,000 using a continuous reaction apparatus composed of three or more stirred flow reactors connected in series, which process comprises the steps of:

continuously feeding from 50 to 98 parts by weight of a lactide and from 2 to 50 parts by weight of a polymer having a hydroxyl group in a molten state or as dissolved in a solvent to the first reactor of said continuous reaction apparatus; and transferring the reaction mixture from said first reactor to the following reactors successively while maintaining the reaction pressure and the reaction temperature in every reactor in the range of from 1 to 5 atm. and of from 140° to 210° C., respectively, to conduct ring opening copolymerization.

2. A process as claimed in claim 1, wherein the rate of polymerization of the lactide in the first reactor is from 30 to 80% and the reaction mixture in that reactor has a viscosity of not higher than 2000 poise.

3. A process as claimed in claim 1, wherein said polymer having a hydroxyl group is a hydroxyl-terminated polyester having a melting point or a softening point of not higher than 180° C.

4. A process as claimed in any one of claims 1 to 3, wherein 3 to 30 parts by weight of a solvent having a boiling point of from 70° to 180° C. is used as a reaction solvent per 100 parts by weight of the total amount of the lactide and the polymer having a hydroxyl group.

5. A process as claimed in any one of claims 1 to 3, wherein a residual lactide and/or a residual solvent in the copolymer obtained after the reaction is/are reduced to 1% by weight or less.

6. A process as claimed in any one of claims 1 to 3, wherein 3 to 30 parts by weight of a solvent having a boiling point of from 70° to 180° C. is used as a reaction solvent per 100 parts by weight of the total amount of the lactide and the hydroxyl-containing polymer to conduct the ring opening polymerization and, after the reaction, a residual lactide and/or a residual solvent in the copolymer obtained is/are reduced to 1% by weight or less.

7. A process as claimed in any one of claims 1 to 3, wherein the reaction mixture from the last stirred flow reactor is subjected to further ring opening copolymerization in a reactor equipped with a static mixer.

8. A process as claimed in any one of claims 1 to 3, wherein from 3 to 30 parts by weight of a solvent having a boiling point of from 70° to 180° C. is used as a reaction solvent per 100 parts by weight of the total amount of the lactide and the hydroxyl-containing polymer to conduct the ring opening copolymerization, the reaction mixture is subjected to further ring opening copolymerization in a reactor equipped with a static mixer, and, after the reaction, a residual lactide and/or a residual solvent in the copolymer obtained is/are reduced to 1% by weight or less.

* * * * *